(12) United States Patent
Fu

(10) Patent No.: US 10,382,481 B2
(45) Date of Patent: Aug. 13, 2019

(54) SYSTEM AND METHOD TO SPOOF A TCP RESET FOR AN OUT-OF-BAND SECURITY DEVICE

(71) Applicant: eSentire, Inc., Cambridge (CA)

(72) Inventor: Ming Fu, Guelph (CA)

(73) Assignee: ESENTIRE, INC., Cambridge (CA)

(*) Notice: Subject to any disclaimer, the term of this patent is extended or adjusted under 35 U.S.C. 154(b) by 151 days.

(21) Appl. No.: 15/680,638

(22) Filed: Aug. 18, 2017

(65) Prior Publication Data
US 2019/0058730 A1    Feb. 21, 2019

(51) Int. Cl.
H04L 29/06    (2006.01)

(52) U.S. Cl.
CPC ...... H04L 63/1483 (2013.01); H04L 63/1425 (2013.01); H04L 69/16 (2013.01); H04L 69/166 (2013.01); H04L 69/22 (2013.01)

(58) Field of Classification Search
CPC ............. H04L 63/1483; H04L 63/1425; H04L 69/166; H04L 69/22
See application file for complete search history.

(56) References Cited

U.S. PATENT DOCUMENTS

| 6,208,653 | B1* | 3/2001 | Ogawa | H04Q 11/0478 370/229 |
|---|---|---|---|---|
| 7,467,202 | B2 | 12/2008 | Savchuk | |
| 7,657,938 | B2 | 2/2010 | Palmer, Jr. et al. | |
| 9,124,625 | B1 | 9/2015 | Seger | |
| 9,338,192 | B1* | 5/2016 | He | H04L 65/1069 |
| 9,641,485 | B1* | 5/2017 | Gynn | H04L 63/0254 |
| 2009/0161568 | A1* | 6/2009 | Kastner | H04L 69/16 370/252 |
| 2009/0310500 | A1* | 12/2009 | Matsuda | H04L 43/0864 370/252 |
| 2011/0088092 | A1* | 4/2011 | Nguyen | H04L 41/28 726/22 |
| 2013/0198509 | A1* | 8/2013 | Buruganahalli | H04L 67/146 713/151 |

(Continued)

OTHER PUBLICATIONS

Wang et al., "Security Implications of Transport Layer Protocols in Power Grid Synchrophasor Data Communication", IEEE Transactions on Smart Grid ( vol. 7 , Issue: 2 , Mar. 2016) (Year: 2015).*

(Continued)

*Primary Examiner* — Morshed Mehedi

(57) ABSTRACT

Systems and methods are provided to reset a TCP connection such as in response to a security policy violation. To address reset conditions under RFC 5961, for example, TCP RST segments may be spoofed and injected into communications between endpoints (e.g. client and server). In one example, three segments may be spoofed with two having respective predicted sequence numbers to invoke a reset and the third having a sequence number to invoke a challenge ACK. If a challenge ACK is received, one or more additional TCP RST segments may be injected using segment information from the challenge ACK to predict new sequence numbers, one to invoke a reset and the other, if used, to invoke a further challenge ACK. Further responsive pairs of additional TCP RST segments may be sent in response to any further challenge ACK observed until the reset is successful.

22 Claims, 3 Drawing Sheets

(56) References Cited

U.S. PATENT DOCUMENTS

2015/0215406 A1* 7/2015 Eggert ................. H04L 67/147
709/228
2016/0014077 A1* 1/2016 Plotnik ................ G06F 21/554
726/11
2017/0171070 A1* 6/2017 Kwon .................... H04L 29/06

OTHER PUBLICATIONS

Phillipa Gill, et al.; Characterizing Web Censorship Worldwide: Another Look At the Opennet Initiative Data; Article; 2014; 29 pages; vol. 0, No. 0; ACM, Inc.; New York, NY, USA.

* cited by examiner

SYSTEM AND METHOD TO SPOOF A TCP RESET FOR AN OUT-OF-BAND SECURITY DEVICE

FIELD

The following disclosure relates to Transmission Control Protocol (TCP) and to terminating a TCP connection. More particularly, the disclosure relates to a system and method to spoof a TCP RESET by an out-of-band security device, for example, to terminate an unwanted TCP connection.

BACKGROUND

TCP is one of the main end-to-end protocols for Internet communications. It provides complementary functionality to Internet Protocol (IP) to make such communications reliable, ordered and error checked. TCP receives data in a data stream to be communicated, divides it, and adds a TCP header to define successive TCP segments, sometimes referenced as packets. The TCP header is described by various protocol definitions such as (Request for Comment) RFC 793 entitled "TRANSMISSION CONTROL PROTOCOL, DARPA INTERNET PROGRAM PROTOCOL SPECIFICATION" dated September 1981, prepared for Defense Advanced Research Projects Agency (DARPA). Supplemental documents such as RFC 5961 entitled "Improving TCP's Robustness to Blind In-Window Attacks", dated August 2010, provide further description about how TCP segments can be handled in specific situations. Both RFC 793 and RFC 5961 are published by the Internet Engineering Task Force (IETF) at ietf.org and are incorporated herein by reference.

A spoofed TCP RST (reset) segment is a common tool used by hackers as well as network security devices to disrupt TCP traffic. For example, a security device may use a TCP RST segment to terminate a TCP connection that violates a security policy. The TCP RST segment is a spoofed packet meant to cause a TCP connection termination. Newer TCP stacks (e.g. software implementing the TCP or TCP/IP protocols layers) implement more restrictive controls on the processing of a TCP RST segment such that spoofing a RST segment to successfully terminate a TCP connection has become more difficult. Such stacks may implement RFC 5961 for example. This can be good for some security aspects, but can make it more challenging for an out-of-band security device, such as one monitoring traffic for security purposes, to disturb unwanted TCP traffic.

SUMMARY

Systems and methods are provided to reset a TCP connection such as in response to a security policy violation. To address reset conditions under RFC 5961, for example, TCP RST segments may be spoofed and injected into communications between endpoints (e.g. client and server). In one example, three segments may be spoofed with two having respective predicted sequence numbers to invoke a reset, the third having a sequence number to invoke a challenge ACK. If a challenge ACK is received, one or more additional TCP RST segments may be injected using segment information from the challenge ACK to predict new sequence numbers, one to invoke a reset and the other, if used, to invoke a further challenge ACK. Further responsive pairs of additional TCP RST segments may be sent in response to any further challenge ACK observed until the reset is successful.

There is provided a computing device comprising hardware and/or software to inject spoofed Transmission Control Protocol (TCP) RST (reset) segments into communication traffic between sender and receiver endpoints of a TCP connection. The computing device is configured to: define spoofed TCP RST segments (RST-SEG_1, RST-SEG_2) to inject into the traffic to communicate to the receiver endpoint, each having a predicted sequence number (SEQ) determined using observed segments of traffic between the endpoints, such that: RST-SEG_1.SEQ=SEG.SEQ; and RST-SEG_2.SEQ=SEG.SEQ+SEG.LEN; where SEG represents that last segment observed from the sending endpoint and SEG.LEN is a segment length of SEG; and inject segments RST-SEG _1, RST-SEG_2 for communication to the receiver endpoint.

The computing device may be configured to define a spoofed TCP RST segment RST-SEG_3 to inject into traffic with segments RST-SEG_1, RST-SEG_2, where RST-SEG_3.SEQ=SEG.SEQ+(RCV.WND/2) and RCV.WND is a receive window of the receiver endpoint; and inject segment RST-SEG_3 for communication to the receiver endpoint.

The computing device may be configured to, upon receipt from the receiver endpoint of a challenge ACK segment (CH-SEG) while waiting for a RST segment from the receiver endpoint: define an additional TCP RST segment RST-SEG_4 using a TCP state of the receiver endpoint from TCP segment values received in the CH_SEG response, such that RST-SEG_4.SEQ=CH-SEG.ACK; and inject the segment RST-SEG_4 for communication to the receiver endpoint. The computing device may be configured to: define a spoofed TCP RST segment RST-SEG_5 to inject into traffic with segment RST-SEG_4 using a TCP state of the receiver endpoint from TCP segment values received in the CH_SEG response, such that RST-SEG_5.SEQ=CH-SEQ.ACK+(RCV.WND/2); and inject segment RST-SEG_5 for communication to the receiver endpoint. The computing device may be configured to, upon receipt of a new CH-SEG while waiting for a RST from the receiver endpoint after communication segment RST-SEG_5, define a new pair of TCP RST segments in the same form as RST-SEG_4 and RST-SEG_5 using the new CH-SEG.ACK value in the new CH-SEG response and inject the new pair of TCP RST segments.

The computing device may be configured to monitor traffic from the receiver endpoint for a RST under a timer and repeat operations to define and inject spoofed TCP RST segments (RST-SEG_1, RST-SEG_2) using a current state of communications if the timer expires before the RST is received.

The computing device may be configured to: observe the communication traffic between the sender and receiver endpoints; and determine and store current segment variables, and send sequence variables and receive sequence variables in accordance with TCP with which to define the spoofed TCP RST segments.

The computing device may be configured to determine a security violation from the traffic and wherein the spoofed TCP RST segments are defined and injected in response to the security violation.

The receiver endpoint may be configured to implement a requirement of RFC 5961 comprising sending a challenge ACK segment in reply to a TCP RST segment when the sequence number in the TCP RST segment is not an exact match to an expected sequence number of the receiver endpoint.

The computing device may comprise at least one processor, a storage device storing instructions in a non-transient manner to configure the execution of the processor and at least one communication unit for communicating the spoofed TCP RST segments.

The computing device may comprise an out of band network security device configured to observe traffic, detect a security violation and take action in response to the security violation, the action comprising resetting a TCP connection.

There is provided a computer implemented method to inject spoofed Transmission Control Protocol (TCP) RST (reset) segments into communication traffic between sender and receiver endpoints of a TCP connection. This method comprises: defining spoofed TCP RST segments (RST-SEG_1, RST-SEG_2) to inject into the traffic to communicate to the receiver endpoint, each having a predicted sequence number (SEQ) determined using observed segments of traffic between the endpoints, such that: RST-SEG_1.SEQ=SEG.SEQ; and RST-SEG_2.SEQ=SEG.SEQ+SEG.LEN; where SEG represents that last segment observed from the sending endpoint and SEG.LEN is a segment length of SEG; and injecting segments RST-SEG_1, RST-SEG_2 for communication to the receiver endpoint.

These and other aspects, including computer-readable media aspects (e.g. device storing instructions in a non-transient manner to configure the execution of a processor of a computing device to perform method aspects) while be apparent to those ordinarily skilled in the art.

DETAILED DESCRIPTION

Figure 1:
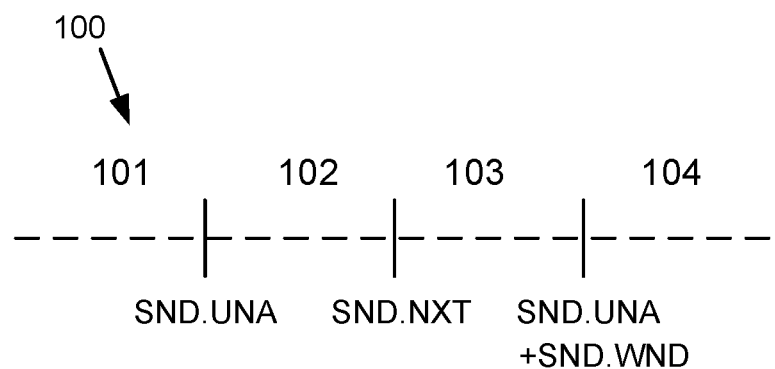
FIGS. 1 and 2 are respective illustrations of a send sequence space and a receive sequence space in accordance with the prior art.

As noted, TCP is described in RFC 793 and selected aspects are described herein for context. Table 1 shows a TCP Header:

Among other fields the TCP header definition provides for the following that are pertinent to TCP reset operations:

Source port—the sending port;

Destination port—the receiving port;

Sequence number (SEQ)—provides two roles depending on whether the SYN flag is set. If set (1), then SEQ is the initial sequence number. The sequence number of the actual first data byte and the acknowledged number in the corresponding ACK are the sequence number plus 1. If not set (0), then SEQ is the accumulated sequence number of the first data byte of this segment for the current session;

Acknowledgment number—If ACK is set then the value of this field in the present segment (SEG) is the next sequence number that the sender is expecting. This acknowledges receipt of all prior bytes (if any). The first ACK sent by each end acknowledges the other end's initial sequence number itself, but no data;

Data offset—specifies the size of the TCP header and also the offset from the start of the TCP segment to the actual data;

Flags (aka Control bits) including:

ACK—indicates that the Acknowledgment field is significant. All packets after the initial SYN packet sent by the client should have this flag set;

RST—Reset the connection; and

SYN—Synchronize sequence numbers; and

Window size (RCV)—specifying the size of the receive window, (beyond the segment identified by the sequence number in the acknowledgment field) that the sender of this segment is currently willing to receive.

Before entering a data transfer phase, TCP connections are established in a multi-step process or handshake for connection establishment. After data transmission is completed, the connection termination closes. Resetting a connection prior to completion causes a tear down and may provoke a rebuild to further the communication. Such activities may incur significant overhead costs to communications on both ends.

TCP uses a sequence number to identify each byte of data. The sequence number identifies the order of the bytes sent from each computer so that the data can be reconstructed in order, regardless of any packet reordering, or packet loss that may occur. The sequence number of the first byte is chosen by the transmitter for the first packet, which is flagged SYN, and the number may be arbitrarily set.

Acknowledgements (ACKs) are sent with a sequence number by the data receiver to tell the sender that data has

TABLE 1

TCP Header

| | | TCP Header | | | |
|---|---|---|---|---|---|
| Offsets | Octet | 0 | 1 | 2 | 3 |
| Octet | Bit | 0 1 2 3 4 5 6 7 8 9 10 11 12 13 14 15 | 16 17 18 19 20 21 22 23 | 24 25 26 27 28 29 30 31 | |
| 0 | 0 | Source port | | Destination port | |
| 4 | 32 | Sequence number | | | |
| 8 | 64 | Acknowledgment number (if ACK set) | | | |
| 12 | 96 | Data offset  Reserved N C E U A P R S F<br>0 0 0 S R E G  W C R  C S S Y I<br>K H T N N | | Window Size | |
| 16 | 128 | Checksum | | Urgent pointer (if URG set) | |
| 20 | 160 | Options (if data offset >5. Padded at the end with "0" bytes if necessary.) | | | |
| ... | ... | ... | | | | been received to the specified number (of bytes). As a form of error detection, sequence numbers allow receivers to discard duplicate packets and properly sequence reordered packets. Acknowledgments allow senders to determine when to retransmit packets that may be lost.

TCP uses an end-to-end flow control protocol to avoid having the sender send data too quickly for the TCP receiver to handle reliably. TCP uses a sliding window flow control protocol. In each TCP segment, the receiver specifies in the receive window field the amount of additionally received data (in bytes) that it is willing to buffer for the connection. The sender can send only up to that amount of data before it must wait for an acknowledgment and a window update from the receiver.

In the description herein, values or quanta of fields of a TCP header and variables maintained in a connection record (e.g. Transmission Control Block or TCB) are used to explain TCP operations for sending and receiving ends of a connection. Terminology herein is that of RFC 793. Several variables relating to the send and receive sequence numbers are stored in the TCB. Some of the send sequence and receive sequence variables having pertinence to TCP RST are:

Send Sequence Variables:
SND.UNA—send unacknowledged;
SND.NXT—send next; and
SND.WND—send window.
Receive Sequence Variables:
RCV.NXT—receive next; and
RCV.WND—receive window.

Figure 2:
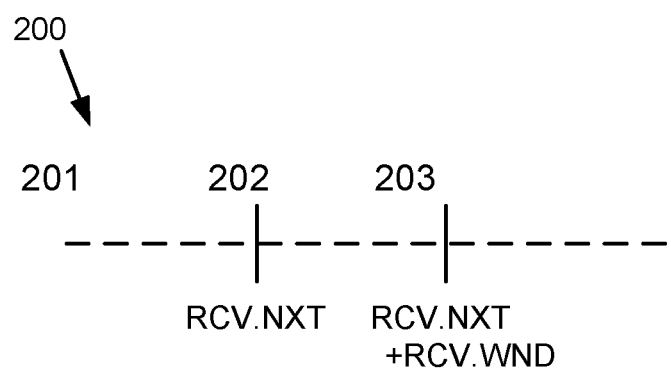

FIGS. 1 and 2 (adapted from FIGS. 4 and 5 of RFC 793) relate some of these variables to the sequence space. FIG. 1 illustrates a send sequence space 100 in which the respective portions show:

101—old sequence numbers which have been acknowledged;
102—sequence numbers of unacknowledged data;
103—sequence numbers allowed for new data transmission; and
104—future sequence numbers which are not yet allowed.

Thus the send window is portion 103 of the sequence space 100 in FIG. 1.

FIG. 2 illustrates a receive sequence space 200 in which the respective portions show:

201—old sequence numbers which have been acknowledged;
202—sequence numbers allowed for new reception; and
203—future sequence numbers which are not yet allowed.

The receive window is portion 202 of the sequence space 200 in FIG. 2.

There are also some variables used frequently in the discussion below that take their values from the fields of the current segment (again adapted from RFC 793), where:

Current Segment Variables:
SEG.SEQ—segment sequence number;
SEG.ACK—segment acknowledgment number;
SEG.LEN—segment length; and
SEG.WND—segment window.

RST and RFC 793

RFC 793 states that a TCP receiver implementation should handle a TCP RST as follows:

1. If the RST bit is set and the sequence number is outside the current receive window (SEG.SEQ<=RCV.NXT||SEG.SEQ>RCV.NXT+RCV.WND), silently drop the segment.

2. If the RST bit is set and the sequence number is inside the current receive window (SEG.SEQ>RCV.NXT && SEG.SEQ<=RCV.NXT+RCV.WND), then reset the connection.

A network component such as an intermediate (e.g. out-of-band) network security device monitoring network traffic over a connection between two endpoints may predict a receiver's window to set and interject a spoofed RST segment sequence number. The term "intermediate" here is intended to denote a device observing the traffic between the endpoints such that the device is at least notionally intermediate or between the endpoints. The sequence number space is from RCV.NXT to RCV.NXT+RCV.WND (per FIG. 2). The window is typically a few kilobytes to hundreds of kilobytes. The chance that a RESET segment can be interjected against a moving window is very high. Even if the TCP connection shifted its window while the intermediate device is performing its processing, the last known TCP segment sequence number plus a DELTA (DELTA >a few packet size && DELTA <RCV.WND) is usually sufficient to spoof a usable sequence number. Hence:

RCV.NXT=SEG.SEQ+DELTA;
DELTA~=RCV.WND/2 && DELTA>SEG.LEN

The intermediate device does not have to keep observing the connection as the killing success rate is high.

However, this older RST protocol may not be implemented in newer stacks.

RST and RFC 5961

RFC 5961 recognizes RST injection attacks with predicted sequence number values and substantially tightens the validity of the RST by the following rules:

1. If the RST bit is set and the sequence number is outside the current receive window (SEG.SEQ<=RCV.NXT||SEG.SEQ>RCV.NXT+RCV.WND), silently drop the segment;

2. If the RST bit is set and the sequence number exactly matches the next expected sequence number (RCV.NXT), then TCP MUST reset the connection (emphasis added); and 3. If the RST bit is set and the sequence number does not exactly match the next expected sequence value, yet is within the current receive window (SEG.SEQ>RCV.NXT||SEG.SEQ<RCV.NXT+RCV.WND), TCP MUST send an acknowledgement (challenge ACK):

<SEQ=SND.NXT><ACK=RCV.NXT><CTL=ACK>

After sending the challenge ACK, TCP MUST drop the unacceptable segment and stop processing the incoming packet further. Further segment(s) destined to this connection will be processed as normal.

The challenge for a network security device is there is only one correct sequence number that can reset the connection at any moment. The previous method of just spoofing the sequence number in the window has a very low probability of matching strict RESET sequence number validation. For an out-of-band security device, it is not practical to hold the traffic so as to prevent the TCP window from shifting. The security device has to race against a shifting target with precision.

RFC 5961 requires the receiver of a RST segment to challenge ACK when the RST sequence number is not an exact match. This challenge ACK provides the network observer a continuous chance to aim the next spoofed RESET against the moving target.

For a typical client-server connection, usually only one side of the TCP connection is sending data. When a HTTP client is receiving an executable download, it will not send more HTTP requests. At this moment, the server receiving window is fixed. The security device spoof only has to work against a shifting client receive window.

When the security device spoofs a RST segment to the client, the security device knows the TCP client receiver window size (RCV.WND) and the last segment observed that violates the security policy. The last SEG contains the segment sequence number and payload length (SEG.SEQ, SEG.LEN). The security device may then send the following three RST packets to terminate the connection. The first RST segment RST-SEG_1 covers the case where the RST segment will race to the client before the observed segment (SEG). The second RST segment RST-SEG_2 covers the case where the first RST segment lost the race to the observed segment (SEG) but arrives before other segments after the observed segment. The third RST segment RST-SEG_3 just tries to fall into the receiver window in order to trigger the challenge ACK and does not (need to) aim at any particular sequence number. Three appropriate segments may be defined and injected where:

RST-SEG_1.SEQ=SEG.SEQ

RST-SEG_2.SEQ=SEG.SEQ+SEG.LEN

RST-SEG_3.SEQ=SEG.SEQ+(RCV.WND/2)

If the first RST segment (RST-SEG_1) or second RST segment (RST-SEG_2) arrives at the intended moment (relative to expected sequence numbers at the receiver), the spoofed termination works. Otherwise, the security device waits for the challenge ACK segment (CH-SEG) triggered by the third segment (RST-SEG_3) or otherwise triggered. This CH-SEG has zero length pay load. It reveals the current receiver's TCP state from the CH-SEG.ACK and CH-SEG.SEQ values. The CH-SEG.ACK is the current RCV.NXT of the endpoint (client in this example) that makes the challenge. By capturing (observing) this challenge ACK, the security device can make two new spoofed RST segments RST-SEG_4 and RST-SEG_5 using the updated RCV.NXT of the client, where:

RST-SEG_4.SEQ=CH-SEG.ACK

RST-SEG_5.SEQ=CH-SEG.ACK+(RCV.WND/2).

The fourth segment RST-SEG_4 (i.e. first after receiving the CH-SEG) attempts to terminate the connection by a good known sequence number and the fifth segment RST-SEG_5 attempts to keep the client sending another challenge ACK (CH-SEG) if the fourth segment fails to reset. This process of sending new fourth and fifth segments can continue until the connection goes silent.

It is understood that inclusion of RST-SEG_3, RST-SEG_5 or both is useful to provoke a reply of CH-SEG if a RST segment is not properly configured by the security device. These provoking segments are not strictly necessary. The security device could monitor for a zero sized ACK occurring for another reason.

Monitoring for continuing traffic on the connection (e.g. for a few seconds) may be necessary to confirm a reset was successfully provoked.

It is understood that the approach herein works with "normal" TCP ACK without payload as well (i.e. 0 sized ACK). The intermediate security device does not know if an endpoint implements RFC 5961 or not, or the endpoint uses another undefined way to restrict the acceptance of RST. But as long as the connection is alive, the intermediate security device will have a high likelihood that it will observe a zero sized ACK. The security device can use the techniques herein to better aim the next RST. The device may send a next segment N where RST-SEG_N.SEQ=CH-SEG.ACK and CH-SEG is the observed zero sized ACK. Thus, adding an additional RST segment N+1 (e.g. similar to RST-SEG_3 or RST-SEG_5) where the SEQ is within the receive window (e.g. RST-SEG_N+1.SEQ=CH-SEG.ACK+ (RCV.WND/2)) to trigger a challenge ACK in reply if the endpoint has fully implemented RFC 5961 will improve the chance that a zero sized ACK can be observed. However, any zero sized ACK will service this purpose.

While the above example is described where the endpoint being reset is the client device, a server device may also be the target endpoint to which the RST segments are sent. For example, this may occur when the client device is the endpoint that does the sending within the current connection being monitored. The client may be uploading a file to the server. In this case, the sequence number prediction is about the packet from client to server. Connections in other sender/receiver scenarios (i.e. other than client/server connections) may also be terminated.

Figure 3:
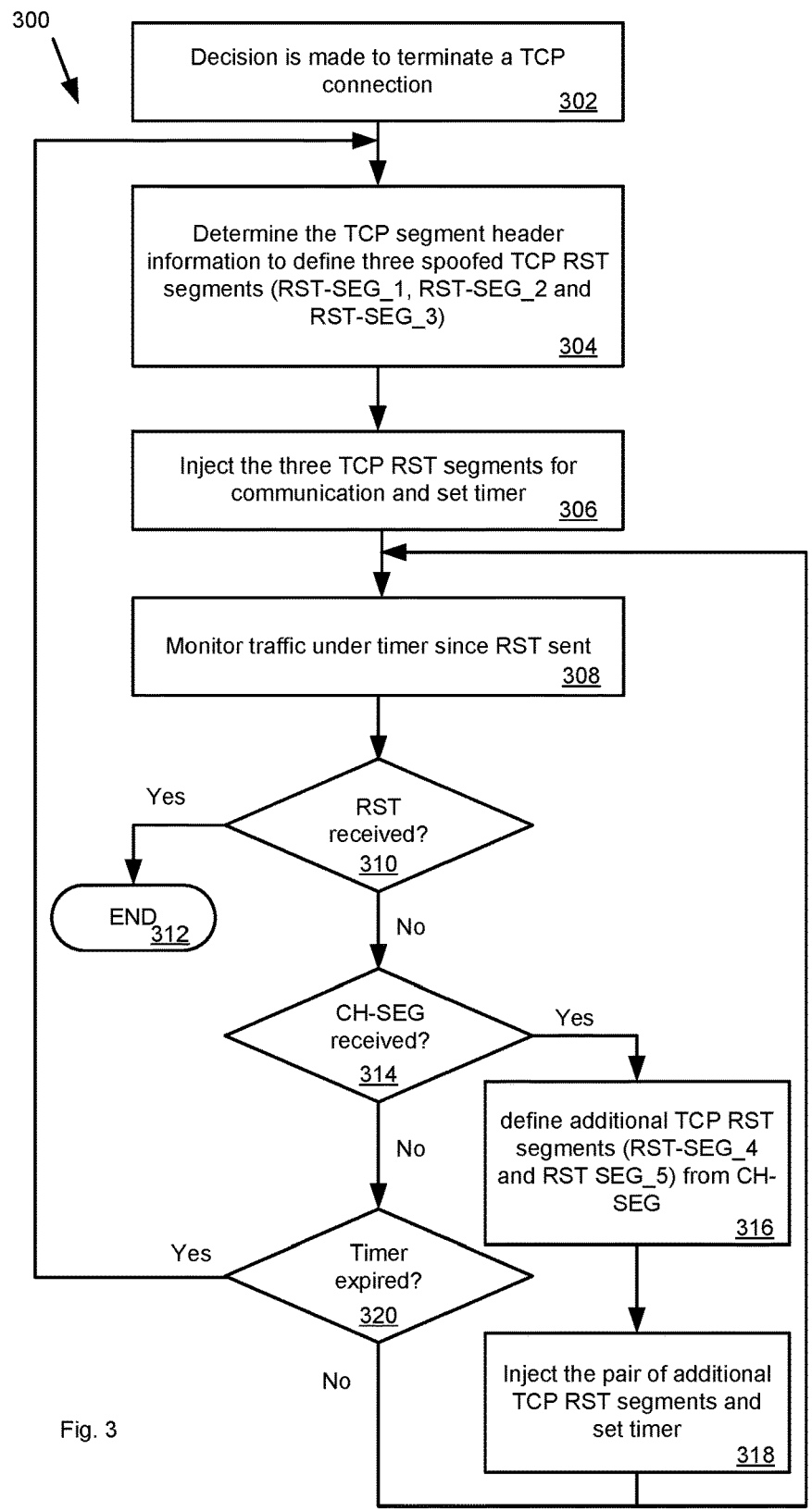
FIG. 3 is a flowchart of operations to inject TCP RST segments in accordance with one example.

FIG. 3 is a flowchart showing operations 300 of a computing device such as a network security device. At 302 a decision is made to terminate a TCP connection between a client endpoint and a server endpoint in communication with one another. For example, it may be determined that a security policy maintained or enforced through observation of segments between the two endpoints by the network security device was violated by the client endpoint. Details regarding the decision and the policy are not material to the present subject matter.

At 304 operations determine the TCP segment header information to define three spoofed TCP RST segments (RST-SEG_1, RST-SEG_2 and RST-SEG_3) in respective packets for injecting to communicate to the client device. At least some of this information may be stored in a TCB or otherwise from observed segments. The information includes predicted sequence numbers (SEQ) determined from observed segments such that:

RST-SEG_1.SEQ=SEG.SEQ

RST-SEG_2.SEQ=SEG.SEQ+SEG.LEN

RST-SEG_3.SEQ=SEG.SEQ+(RCV.WND/2)

Where RCV.WND is the receive window of the client endpoint and SEG represents that last segment received (observed) (e.g. that violates the security policy).

At 306, the TCP segments are injected for communication to the client. A timer is set to monitor traffic for a RST. If no RST is received within the time, a further attempt to reset can be made. It will be appreciated that the stack may configure these segments for additional protocols such as IP defining respective packets. At 308, traffic is monitored under the timer, looking for a RST or challenge ACK (CH-SEG).

At 310, operations may branch depending on the success of the first three injected segments. If one of RST-SEG_1 and RST_SEG_2 is successful to reset the connection then, via Yes branch, operations 300 end at 312. If the invocation of a reset is not successful then RST-SEG_3 ought to invoke a challenge ACK segment (CH-SEG) in response from the client. At 314 a determination is made whether a CH-SEG is received. If yes, then via branch to 316 operations 300 then determine TCP header information for two additional RST segments (RST-SEG_4 and RST SEG_5) using the current (client) receiver's TCP state from the CH-SEG.ACK and CH-SEG.SEQ values. The CH-SEG.ACK is the current RCV.NXT of the client that makes the challenge such that:

RST-SEG_4.SEQ=CH-SEG.ACK

RST-SEG_5.SEQ=CH-SEG.ACK+(RCV.WND/2)

At 318 these two further TCP segments are injected and a timer is restarted.

Operations then loop to 308 to repeat operations if necessary, sending new TCP segments from any new information in a new CH-SEG received from the client if the reset is not successful, etc.

At 320 a determination is made whether the time has expired. If no, operations loop to 308. If yes, operations look to 304.

It is understood that preparing and sending segments to invoke a CH-SEG are optional. Operations 300 may monitor traffic for a CH-SEG that is sent for other reasons.

Figure 4:
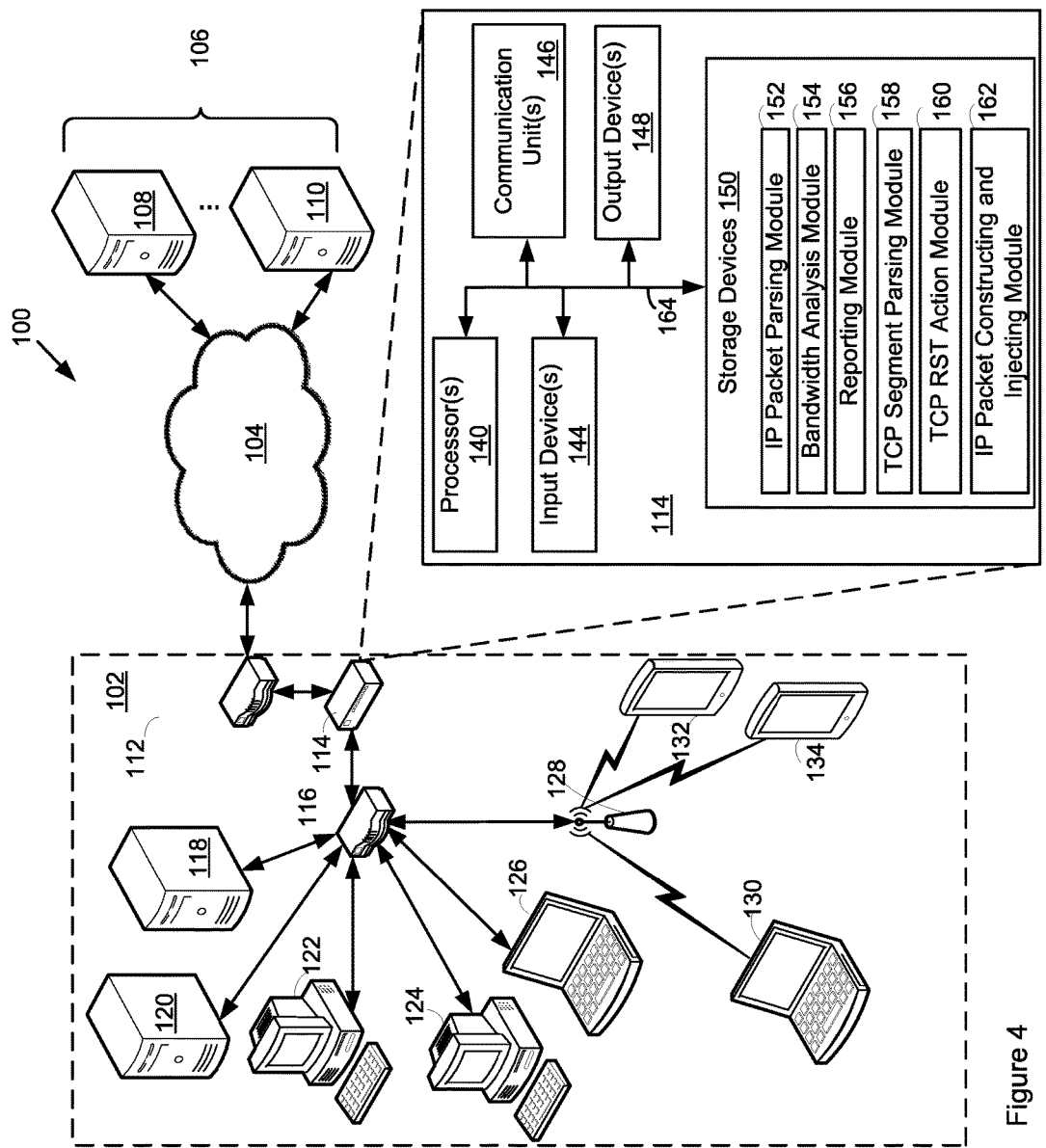
FIG. 4 is a block diagram of a computer network in accordance with one or more aspects of the present disclosure including a computing device configured to interject TCP RST segments in accordance with one or more method aspects disclosed herein.

FIG. 4 is a block diagram of a computer network 400 in accordance with one or more aspects of the present disclosure including a computing device configured to interject TCP RST segments in accordance with one or more method aspects disclosed herein. In one example, the computing device may be an out-of-band network security device that sits atop/beside an in-band network device to monitor network traffic between endpoint devices of an enterprise and those outside. Suspicious connections can be detected and reset. One feature that is monitored may be excessive bandwidth usage such as by internet protocol (IP) address. The computing device may be other devices in the network and need not be a special purpose security device per se.

With respect to representative communication network 100 of FIG. 4, there is shown an enterprise network 102 coupled for communication to a wide area network 104 such as the Internet. Network 104 is coupled for communication with a plurality of (potential) endpoints 106 such as servers 108 and 110. It is understood that representative communication network 100 is simplified for illustrative purposes. Though endpoints 106 are depicted as servers, other communication devices may be coupled for communications. Additional networks may also be coupled to network 104 and/or to enterprise network 102.

Enterprise network 102 comprises an Internet facing network component 112, an network security device (NSD) 114 and a local area network (LAN) component 116. LAN component 116 may couple a plurality of (potential endpoint) components for communication within the enterprise and/or externally to network 104 such as servers 118, 120, desktop computing devices 122, 124, laptop device 126 and via a wireless routing device 128, laptop 130 and wireless devices 132 and 134. Wireless devices may be tablets, smartphones, smart appliances, or other wireless communication devices which may or may not be mobile. The various networks depicted typically comprise Internet protocol based networks and typically send TCP segments among other types. In one aspect, data transmitted between two source (sender) and destination (receiver) endpoints may be defined as a conversation and a packet length total accumulated over a period of monitoring may define bandwidth usage in the period.

NSD 114 is depicted between network devices 112 and 116. It may also be configured to communicate out of band, for example, a top or adjacent component 112 without direct coupling to component 116. Similarly an NSD component may be configured in a network to monitor local traffic, for example, sitting a top component 116. NSD may be configured in one aspect as a network appliance for cyber security threat detection and prevention. As noted though, this computing device may take other forms.

In one aspect NSD 114 monitors network packets, parsing the packets to determine respective conversations and gathering statistics for such conversations, possibly among other tasks. Such statistics may be logged and/or otherwise reported such as on a periodic basis. Alarms may be triggered in accordance with various rules, policies or other configurations. TCP segments may be observed. TCP segment header information and variables may be stored to assist with TCP segment processing and to define TCP segments for injecting in to a respective conversation (connection) between endpoints.

NSD 114 may be configured to take remedial action such as on detection of network security or other policy breaches responsive to one or more alarms detected or otherwise triggered such as in response to an input received. In one example, NSD 114 may be configured to terminate a conversation such as by injecting one or more packets into device 112 and/or 116 to trigger a conversation (e.g. TCP connection) reset or other response.

FIG. 4 also illustrates NSD 114 in an enlarged block form in accordance with one or more aspects of the present disclosure, for example to provide methods and systems to inject spoofed TCP RST segments. NSD 114 comprises one or more processors 140, one or more input devices 144, one or more communication units 146 and one or more output devices 148. Communication units 146 may include a physical network interface and/or "network listening interface. These interfaces may not have to initiate or receive any network connection or be configured to do so, they are typically in a listening mode with no IP address assigned to the interface. NSD 114 also includes one or more storage devices 150 storing one or more modules (e.g. software, data) such as an IP packet parsing module 152, bandwidth analysis module 154, reporting module 156, TCP segment parsing module 158, TCP RST module 160 and IP packet constructing and injecting module 164. Communication channels 164 may couple each of the components 140-150 and modules 152-162 for inter-component communications, whether communicatively, physically and/or operatively. In some examples, communication channels 164 may include a system bus, a network connection, an inter-process communication data structure, or any other method for communicating data.

One or more processors 140 may implement functionality and/or execute instructions within NID 114. For example, processors 140 may be configured to receive instructions and/or data from storage devices 150 to execute the functionality of the modules shown, among others (e.g. operating system, communications, user interface, etc.) NSD 114 may store data/information to storage devices 150. Some of the functionality is described further herein above and below.

One or more communication units 146 may communicate with external devices such as components 112 and 116 via one or more networks by transmitting and/or receiving network signals on the one or more networks. Though a NSD 114 may use communication units in one or more configurations, because it is monitoring significant traffic on high-speed networks, it is typically configured for efficient processing and communication. As such, an example communication unit includes a network intercept card/device (e.g. such as an Ethernet card).

Input and output devices may include any of one or more buttons, switches, pointing devices, a keyboard, a microphone, one or more sensors (e.g. biometric, GPS, etc.) a speaker, a bell, one or more lights, etc. NSD 114 may also include one or more I/O devices such as a touch sensitive or presence sensitive display. One or more of same may be coupled to NSD 114 via a universal serial bus (USB) or other communication channel (e.g. 164). As a network monitoring component however, NSD 114 is usually configured with few "unnecessary" components as it is not a personal computing device configured to assist a user.

The one or more storage devices 150 may store instructions and/or data for processing during operation of NSD 114. The one or more storage devices may take different forms and/or configurations, for example, as short-term memory or long-term memory. Storage devices 150 may be configured for short-term storage of information as volatile memory, which does not retain stored contents when power is removed. Volatile memory examples include random access memory (RAM), dynamic random access memory (DRAM), static random access memory (SRAM), etc. Storage devices 150, in some examples, also include one or more computer-readable storage media, for example, to store larger amounts of information than volatile memory and/or to store such information for long term, retaining information when power is removed. Non-volatile memory examples include magnetic hard discs, optical discs, floppy discs, flash memories, or forms of electrically programmable memory (EPROM) or electrically erasable and programmable (EEPROM) memory.

IP packet parsing module 152 may be configured to perform IP packet parsing on observed packets in communications between endpoints such as a client (e.g. 132) and server (e.g. 108 among other combinations within network 400) to determine values of various header and pay load portions. Bandwidth analysis module 154 may be configured to perform analyses on IP packets, for example, to determine bandwidth usage during a period for a particular connection. Reporting module 156 may report performance, action taken and outcomes, etc.

TCP segment parsing module 158 may parse TCP segments to determine values of various TCP segment header and pay load portions. TCP RST action module 160 may implement a TCP reset strategy as described, defining TCP RST segments and invoking injection in communications (as IP packets via IP packet constructing and injecting module 164) between endpoints such as a client (e.g. 132) and server (e.g. 108).

The operations shown in FIG. 3 may be performed by NSD 114, in accordance with an example, and may be implemented by modules 152-162 configuring the execution of processors 140. It is understood that operations described or inherent herein may not fall exactly within the modules 152-162 such that one module may assist with the functionality of another. Other modules not shown may also assist such a communication modules, operating system modules, etc.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit.

Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium. By way of example, and not limitation, such computer-readable storage media can comprise RAM, ROM, EEPROM, optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using wired or wireless technologies, such are included in the definition of medium. It should be understood, however, that computer-readable storage media and data storage media do not include connections, carrier waves, signals, or other transient media, but are instead directed to non-transient, tangible storage media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. The techniques could be implemented in one or more circuits or logic elements.

While the techniques of this disclosure may be implemented in a wide variety of devices or apparatuses, an integrated circuit (IC) or a set of ICs (e.g., a chip set), as noted, a preferred device is a network intercept device coupled adjacent a network entity to enable the monitoring of multiple network endpoints and, in some examples at least, the taking of remedial action such as interjecting packets into the monitored traffic (conversations).

Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various embodiments of the invention have been described. These and other embodiments are within the scope of the following claims.

What is claimed is:

1. A computing device comprising a processor and a storage device coupled thereto, the storage device storing instructions to inject spoofed Transmission Control Protocol (TCP) RST (reset) segments into communication traffic between sender and receiver endpoints of a TCP connection, which instructions when executed by the processor configure the computing device to:
define spoofed TCP RST segments (RST-SEG_1, RST-SEG_2) to inject into the traffic to communicate to the receiver endpoint, each having a predicted sequence number (SEQ) determined using observed segments of traffic between the endpoints, such that:
RST-SEG_1.SEQ=SEG.SEQ; and RST-SEG_2.SEQ=SEG.SEQ+SEG.LEN;
where SEG represents that last segment observed from the sending endpoint and SEG.LEN is a segment length of SEG; and
inject segments RST-SEG_1, RST-SEG_2, for communication to the receiver endpoint.

2. The computing device of claim 1 configured to:
define a spoofed TCP RST segment RST-SEG_3 to inject into traffic with segments RST-SEG_1, RST-SEG_2, where RST-SEG_3.SEQ=SEG.SEQ+(RCV.WND/2) and RCV.WND is a receive window of the receiver endpoint; and
inject segment RST-SEG_3 for communication to the receiver endpoint.

3. The computing device of claim 1 configured to, upon receipt from the receiver endpoint of a challenge ACK segment (CH-SEG) while waiting for a RST segment from the receiver endpoint:
define an additional TCP RST segment RST-SEG_4 using a TCP state of the receiver endpoint from TCP segment values received in the CH_SEG response, such that RST-SEG_4.SEQ=CH-SEG.ACK; and
inject the segment RST-SEG_4 for communication to the receiver endpoint.

4. The computing device of claim 3 configured to:
define a spoofed TCP RST segment RST-SEG_5 to inject into traffic with segment RST-SEG_4 using a TCP state of the receiver endpoint from TCP segment values received in the CH_SEG response, such that RST-SEG_5.SEQ=CH-SEQ.ACK+(RCV.WND/2); and
inject segment RST-SEG_5 for communication to the receiver endpoint.

5. The computing device of claim 4 configured to, upon receipt of a new CH-SEG while waiting for a RST from the receiver endpoint after communication segment RST-SEG_5, define a new pair of TCP RST segments in the same form as RST-SEG_4 and RST-SEG_5 using the new CH-SEG.ACK value in the new CH-SEG response and inject the new pair of TCP RST segments.

6. The computing device of claim 1 configured to monitor traffic from the receiver endpoint for a RST under a timer and repeat operations to define and inject spoofed TCP RST segments (RST-SEG_1, RST-SEG_2) using a current state of communications if the timer expires before the RST is received.

7. The computing device of claim 1 configured to:
observe the communication traffic between the sender and receiver endpoints; and
determine and store current segment variables, and send sequence variables and receive sequence variables in accordance with TCP with which to define the spoofed TCP RST segments.

8. The computing device of claim 1 configured to determine a security violation from the traffic and wherein the spoofed TCP RST segments are defined and injected in response to the security violation.

9. The computing device of claim 1 wherein the receiver endpoint is configured to implement a requirement of RFC 5961 comprising sending a challenge ACK segment in reply to a TCP RST segment when the sequence number in the TCP RST segment is not an exact match to an expected sequence number of the receiver endpoint.

10. The computing device of claim 1 comprising at least one processor, a storage device storing instructions in a non-transient manner to configure the execution of the processor and at least one communication unit for communicating the spoofed TCP RST segments.

11. The computing device of claim 10 comprising an out of band network security device configured to observe traffic, detect a security violation and take action in response to the security violation, the action comprising resetting a TCP connection.

12. A computer implemented method to inject spoofed Transmission Control Protocol (TCP) RST (reset) segments into communication traffic between sender and receiver endpoints of a TCP connection, the method comprising:
defining spoofed TCP RST segments (RST-SEG_1, RST-SEG_2) to inject into the traffic to communicate to the receiver endpoint, each having a predicted sequence number (SEQ) determined using observed segments of traffic between the endpoints, such that:
RST-SEG_1.SEQ=SEG.SEQ; and
RST-SEG_2.SEQ=SEG.SEQ+SEG. LEN;
where SEG represents that last segment observed from the sending endpoint and SEG.LEN is a segment length of SEG; and
injecting segments RST-SEG_1, RST-SEG_2 for communication to the receiver endpoint.

13. The method of claim 12 comprising:
defining a spoofed TCP RST segment RST-SEG_3 to inject into traffic with segments RST-SEG_1, RST-SEG_2, where RST-SEG_3.SEQ=SEG.SEQ+(RCV.WND/2) and RCV.WND is a receive window of the receiver endpoint; and
injecting segment RST-SEG_3 for communication to the receiver endpoint.

14. The method of claim 12 comprising, upon receipt from the receiver endpoint of a challenge ACK segment (CH-SEG) while waiting for a RST segment from the receiver endpoint:
defining an additional TCP RST segment RST-SEG_4 using a TCP state of the receiver endpoint from TCP segment values received in the CH_SEG response, such that RST-SEG_4.SEQ=CH-SEG.ACK; and
injecting the segment RST-SEG_4 for communication to the receiver endpoint.

15. The method of claim 14 comprising:
defining a spoofed TCP RST segment RST-SEG_5 to inject into traffic with segment RST-SEG_4 using a TCP state of the receiver endpoint from TCP segment values received in the CH_SEG response, such that RST-SEG_5.SEQ=CH-SEQ.ACK+(RCV.WND/2); and
injecting segment RST-SEG_5 for communication to the receiver endpoint.

16. The method of claim 15 comprising, upon receipt of a new CH-SEG while waiting for a RST from the receiver endpoint after communication segment RST-SEG_5, defining a new pair of TCP RST segments in the same form as RST-SEG_4 and RST-SEG_5 using the new CH-SEG.ACK value in the new CH-SEG response and injecting the new pair of TCP RST segments.

17. The method of claim 12 comprising monitoring traffic from the receiver endpoint for a RST under a timer and repeating steps to define and inject spoofed TCP RST segments (RST-SEG_1, RST-SEG_2) using a current state of communications if the timer expires before the RST is received.

18. The method of claim 12 comprising:
observing the communication traffic between the sender and receiver endpoints; and determining and storing current segment variables, send sequence variables and receive sequence variables in accordance with TCP with which to define the spoofed TCP RST segments.

19. The method of claim 12 comprising determining a security violation from the traffic and wherein the spoofed TCP RST segments are defined and injected in response to the security violation.

20. The method of claim 12 wherein the receiver endpoint is configured to implement a requirement of RFC 5961 comprising sending a challenge ACK segment in reply to a TCP RST segment when the sequence number in the TCP RST segment is not an exact match to an expected sequence number of the receiver endpoint.

21. The method of claim 12 implemented by an out of band network security device configured to observe traffic, detect a security violation and take action in response to the security violation, the action comprising resetting a TCP connection.

22. A non-transitory computer-readable medium storing instructions to configure the execution of a processor of a computing device to inject spoofed Transmission Control Protocol (TCP) RST (reset) segments into communication traffic between sender and receiver endpoints of a TCP connection by:
- defining spoofed TCP RST segments (RST-SEG_1, RST-SEG_2) to inject into the traffic to communicate to the receiver endpoint, each having a predicted sequence number (SEQ) determined using observed segments of traffic between the endpoints, such that:
  RST-SEG_1.SEQ=SEG.SEQ; and
  RST-SEG_2.SEQ=SEG.SEQ+SEG. LEN;
- where SEG represents that last segment observed from the sending endpoint and SEG.LEN is a segment length of SEG; and
- injecting segments RST-SEG_1, RST-SEG_2 for communication to the receiver endpoint.

* * * * *